Feb. 6, 1940.    H. W. STERTZBACH ET AL    2,189,642
CAR TRUCK AND BRAKING MEANS THEREFOR
Filed Jan. 20, 1938    3 Sheets-Sheet 1

Inventor
H. W. Stertzbach,
C. L. Orr,

By Seymour, Bright & Nottingham
Attorneys

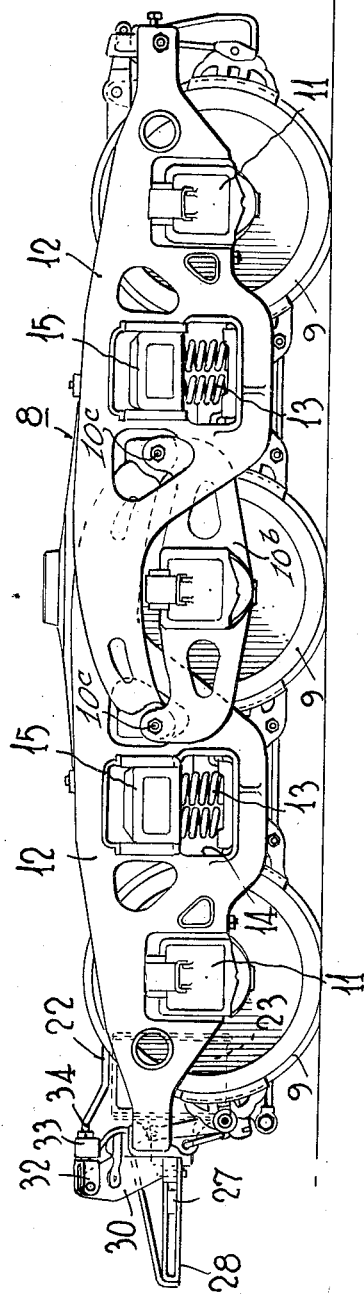

Feb. 6, 1940. H. W. STERTZBACH ET AL 2,189,642
CAR TRUCK AND BRAKING MEANS THEREFOR
Filed Jan. 20, 1938 3 Sheets-Sheet 3
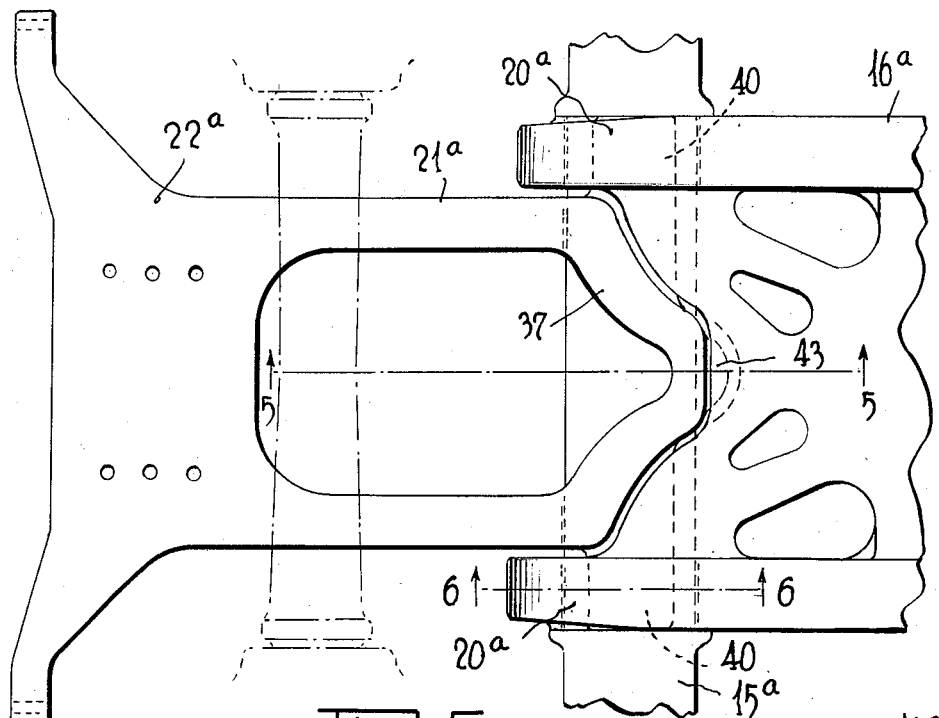
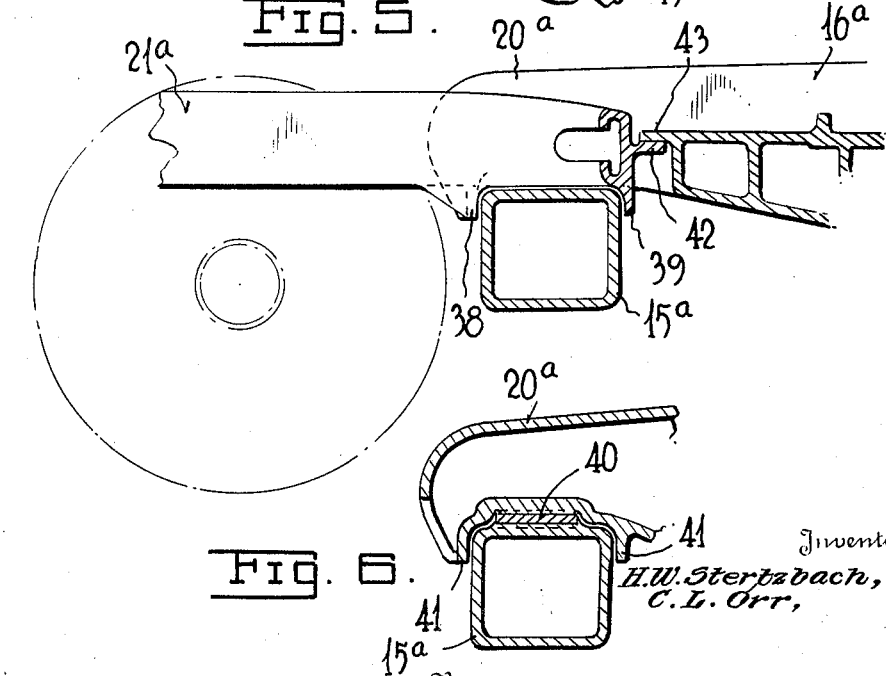
Inventor
H. W. Stertzbach,
C. L. Orr,
By Seymour, Bright & Nottingham
Attorneys Patented Feb. 6, 1940

2,189,642

UNITED STATES PATENT OFFICE 2,189,642

CAR TRUCK AND BRAKING MEANS THEREFOR

Harry W. Stertzbach and Claude L. Orr, Columbus, Ohio, assignors to The Buckeye Steel Castings Company, Columbus, Ohio Application January 20, 1938, Serial No. 185,986

22 Claims. (Cl. 188—46)

This invention relates to brake mechanism for railway car trucks.

Recently, due to higher train speeds and extremely heavy equipment, the older means for transmitting, through pull rods, the forces for application of brakes to the wheels of a truck from a fluid cylinder mounted on the body of the vehicle has been improved by providing fluid cylinders mounted on the truck. The latter means reduces weight by eliminating long pull rods and heavy body lever arrangements, and in general is maintained at less expense and has greater economy and efficiency than the former means of mounting brake cylinders.

The primary purpose of the present invention is to provide improved means for supporting the air or fluid cylinder and for transmitting the movement of the piston thereof to the brakes.

Another object is to furnish improved means for supporting the cylinder by the center bolster of the truck in order to realize the advantage of having the cylinder carried by a spring borne member of the truck.

With the foregoing objects outlined and with other objects in view, the invention consists in the novel features hereinafter described in detail, illustrated in the accompanying drawings, and more particularly pointed out in the appended claims.

In the drawings:

Fig. 2 is a side elevation.

Fig. 3 is a vertical longitudinal sectional view of the truck.

Fig. 4 is a fragmentary view of a truck showing a modification of the center bolster extension.

Figure 1:
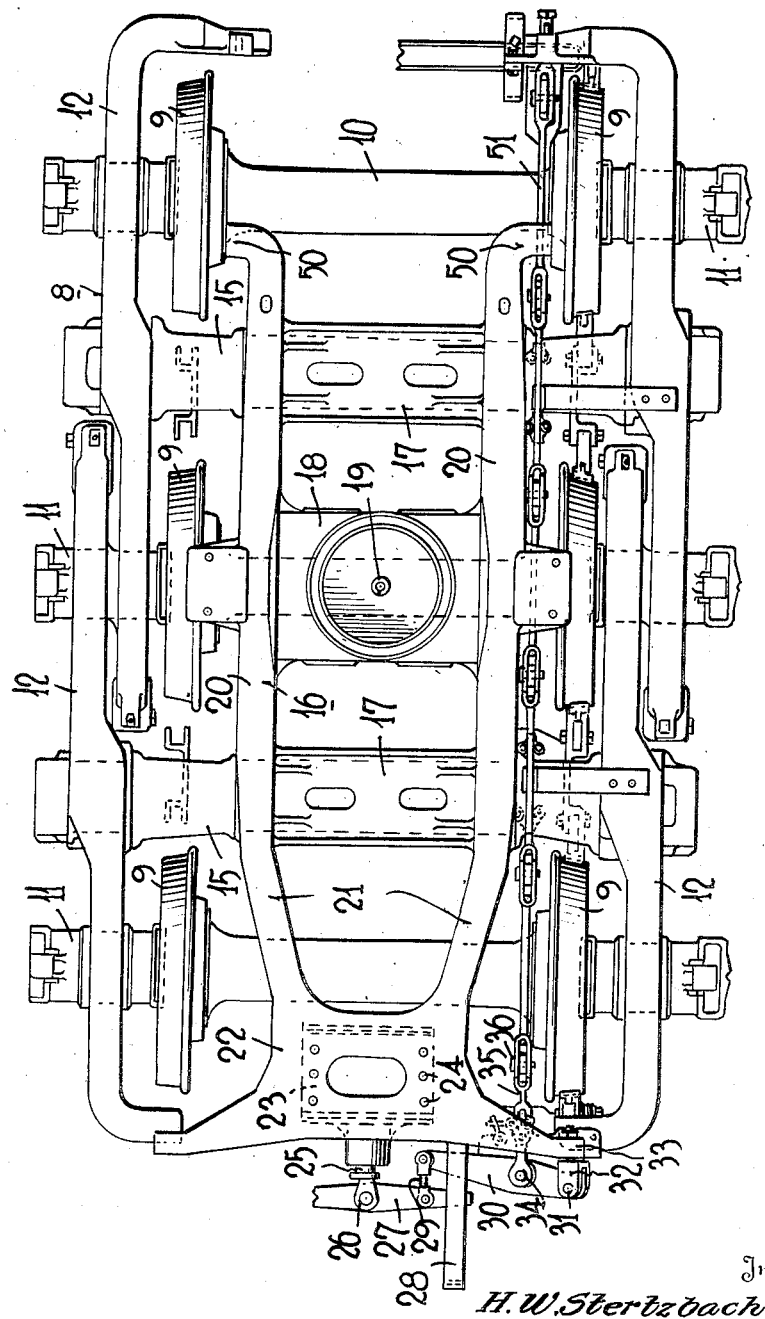
Fig. 1 is a top plan view of a railway car truck provided with our improvements, certain parts being broken away to facilitate disclosure of the invention.

Figs. 5 and 6 are vertical sectional views of details taken on the lines 5—5 and 6—6 of Fig. 4.

Before proceeding with a detailed description of the structure shown in the drawings, we may state that in Fig. 1 the brake mechanism is shown only on one side of the truck, but it is to be understood that the brake system is symmetrical about the longitudinal center line of the truck.

Referring to the drawings, 8 designates a car truck which for the purpose of disclosure is of the six-wheel type, but it is to be further understood that the invention is applicable to trucks of any number of wheels, providing it includes a center bolster.

In the embodiment illustrated, the end truck wheels 9 support end axles 10 journaled in boxes 11 which in turn support the end side frame members 12. The intermediate wheels 9 carry an intermediate axle 10a which supports equalizer side frame members 10b which have their ends movably connected at 10c to the inner ends of the side frame members 12. Transverse bolsters 15 have their ends extending into these openings and resting on the springs.

A center bolster 16 has transverse girder portions 17 resting on the transverse bolsters 15, and the center bolster also has a medial girder 18 with a king-pin connection 19 for supporting a car body (not shown).

In accordance with the invention the transverse girders of the center bolster are connected by spaced substantially parallel longitudinal bars or members 20 which form extension arms 21, at one end of the truck that merge into a horizontally disposed plate or platform portion 22 positioned at one end of the truck. In Figs. 1 to 3 inclusive, the members 17 to 22 inclusive, are all portions of a center bolster casting, and in accordance with the invention, an air or other suitable fluid cylinder 23 is suspended from the plate 22 by any suitable means, such as bolts or rivets 24.

The piston (not shown) which operates in this cylinder, actuates a piston rod 25 in alignment with the longitudinal center line of the truck, and pivotally connected at 26 to the middle of a horizontally disposed, transversely extending lever 27, the ends of which are guided by suitable brackets or guide members 28 projecting from the plate portion of the center bolster, each end portion of the lever being pivotally connected to one end of a link 29, the opposite end of which is pivotally connected to one end of a lever 30 which has its opposite end pivotally supported at 31 by a bracket 32 carried by a laterally extending arm 33 of the plate or extension 22 of the center bolster. A clevis 34 is pivotally connected at one end to the medial portion of the inclined lever, and has its other end loosely connected to a pull rod 35 which in turn is connected by any suitable means 36 to the brake leverage system at that side of the truck. While the leverage system connecting the piston to the brake system is shown and described for only one half the truck, it will be understood that the system is symmetrical about the longitudinal center line of the truck and the piston is operatively connected to the brakes at each side of the truck. The brake system is of the well-known clasp brake type, and while we have shown a portion of the system, it will be unnecessary to describe the same as those skilled in the art will readily understand the invention without such description.

The ends of the center bolster opposite that where the extension 22 is located are provided with oppositely disposed, outwardly extending arms 50 adapted to form supporting means for parts 51 of the braking mechanism. It will thus be seen that the opposite ends of the center bolster at the points 33 and 50 serve as supports for portions of the braking system.

In operation, air or any other suitable pressure fluid is introduced into the cylinder by means not shown, and this pressure forces the piston rod outwardly against the lever 27. The latter moves along its slidable supports or guide brackets 28 causing a pull in the links 29 which turn the levers 30 about their fulcrums 31. This motion creates a pull in the members 34 which pull is transmitted through the pull rods 35 to the brake system at the points 36, thus applying the brakes to the wheels 9 in the usual manner for clasp brakes.

While we have shown the extension 21, 22 in Figs. 1 to 3 inclusive, as integral parts of the center bolster casting, it will be obvious that they might be separate elements rigidly united with the center bolster by any suitable means. Such parts may even be separable members as shown in Figs. 4 to 6 inclusive. In this form of the invention the arms 21a of the extension 22a may be connected at their inner ends by a substantially V-shaped yoke 37 having depending lugs 38, 39 adapted to engage spaced portions of opposite sides of one of the transverse bolsters 15a of the truck. The arms may also be provided with oppositely projecting lateral extensions 40 which lie on the upper surface of the transverse bolster and are clamped to the latter by the ends of the arms 20a of the center bolster 16a. These arms are also preferably provided with depending lugs 41 which engage opposite sides of the transverse bolster.

To further rigidify the structure, the yoke 37 has an inwardly extending shelf 42 that is held down by an overhanging lip 43 forming part of the center bolster. In this form, it will be understood that one end of the center bolster normally rests on portions of the extension 22a and rigidly holds the latter in engagement with the transverse bolster 15a. However, if such end of the center bolster is lifted to a suitable height or the transverse bolster is lowered to a suitable depth, the extension 22a can be readily detached from the center and transverse bolsters.

The brake structure of the present application is disclosed and claimed in our Patent No. 2,088,142, dated July 27, 1937.

We wish it distinctly understood that our improvements described and illustrated are in practical forms for actual construction, and that changes and variations may be made as may be convenient or desirable without departing from the salient features of the invention, and we therefore intend the following claims to cover such modifications as naturally fall within the lines of the invention.

What we claim and desire to secure by Letters Patent is:

1. In a structure of the character described, a railway truck having end axles, end side frame members supported by said end axles, intermediate axle means, side frame equalizing members supported by the intermediate axle means and movably connected to the end side frame members, a bolster system including a center bolster supported by the end side frame members, a braking system, an extension projecting longitudinally from an end of the center bolster, a fluid cylinder carried by said extension and having a piston rod, means operatively connecting the piston rod to the braking system, the last-mentioned means including a lever extending transversely of the truck and having its medial portion connected to the piston rod, a second lever pivotally supported at one end and having its opposite end operatively connected to an end portion of the first-mentioned lever, and means for operatively connecting the medial portion of the second lever to a part of the braking system.

2. In a structure of the character described, a railway truck having end axles, end side frame members supported by said end axles, intermediate axle means, side frame equalizing members supported by the intermediate axle means and movably connected to the end side frame members, a bolster system including a center bolster supported by the end side frame members, a braking system, an extension projecting longitudinally from an end of the center bolster, a fluid cylinder carried by said extension and having a piston rod, means operatively connecting the piston rod to the braking system, the last-mentioned means including a transversely extending lever having its medial portion connected to the piston rod, substantially horizontally disposed guide members carried by said extension and forming supports for slidably supporting the ends of the lever, and means operatively connecting an end portion of the lever to a part of the braking system.

3. In a structure of the character described, a railway truck having end axles, end side frame members supported by said end axles, intermediate axle means, side frame equalizing members supported by the intermediate axle means and movably connected to the end side frame members, a bolster system including a center bolster supported by the end side frame members, a braking system, an extension projecting longitudinally from an end of the center bolster, a fluid cylinder supported by the extension, a piston rod projecting from the cylinder and arranged in alignment with the longitudinal center line of the truck, a transversely extending lever having its medial portion connected to the piston rod to be actuated thereby, and means operatively connecting the end portion of the lever to the braking system.

4. In a structure of the character described, a railway truck having end axles, end side frame members supported by said end axles, intermediate axle means, side frame equalizing members supported by the intermediate axle means and movably connected to the end side frame members, a bolster system including a center bolster supported by the end side frame members, a braking system, an extension projecting longitudinally from an end of the center bolster, a fluid cylinder supported by the extension, a piston rod projecting from the cylinder and arranged in alignment with the longitudinal center line of the truck, a transversely extending lever having its medial portion connection to the piston rod to be actuated thereby, and means operatively connecting the end portion of the lever to the braking system, said means comprising a second lever having its outer end pivotally supported by the extension and its inner end operatively connected with the first-mentioned lever.

5. In a structure of the character described, a car truck having a transverse bolster, a center bolster resting on the transverse bolster, and a brake cylinder supporting extension projecting from one end of the center bolster and rigidly united with the latter, said extension comprising a plate portion from which arms extend toward the center bolster, said arms having projecting portions clamped between the center bolster and the transverse bolster.

6. In a structure of the character described, a car truck having a transverse bolster, a center bolster resting on the transverse bolster, and a brake cylinder supporting extension projecting from one end of the center bolster and rigidly united with the latter, said extension comprising a plate portion from which arms extend toward the center bolster, said arms being connected by a transverse yoke, the center bolster having a portion overlying a portion of the yoke for preventing the latter from rising away from the transverse bolster.

7. In a structure of the character described, a transverse bolster, a center bolster having end portions directly supported by and engaging the transverse bolster, a brake cylinder supporting extension projecting from the center bolster, said extension having oppositely projecting lateral portions lying between said end portions of the center bolster and the transverse bolster.

8. In a structure of the character described, a transverse bolster, a center bolster having end portions directly supported by and engaging the transverse bolster, a brake cylinder supporting extension projecting from the center bolster, said extension having oppositely projecting lateral portions lying between said end portions of the center bolster and the transverse bolster, said extension also resting on and having portions embracing said transverse bolster.

9. In a structure of the character described, a transverse bolster, a center bolster having end portions directly supported by and engaging the transverse bolster, a brake cylinder supporting extension projecting from the center bolster, said extension having oppositely projecting lateral portions lying between said end portions of the center bolster and the transverse bolster, said extension having a shelf projecting toward the center bolster and the latter having a portion overlying said shelf and engaging the latter.

10. In a structure of the character described, a center bolster comprising spaced longitudinally extending bar portions connected together by spaced transverse girder portions, a brake cylinder supporting extension provided at one end of the center bolster and having arms connected to one end of the center bolster, said bar portions at the end of the center bolster opposite to that where the extension is located forming means adapted to support portions of a braking mechanism.

11. In a railway car truck, wheel supported end axles, end side frame members supported by said axles, wheel supported intermediate axle means, side frame equalizing members supported by the intermediate axle means, a bolster system including a center bolster supported by the end side frame members, a braking system, an extension projecting from the end of the center bolster outwardly beyond one of said end axles, a fluid cylinder carried by said extension, arranged outwardly beyond the last-mentioned axle and having a piston rod, and means operatively connecting the piston rod to the braking system.

12. In a railway car truck, wheel supported end axles, end side frame members supported by said axles, wheel supported intermediate axle means, side frame equalizing members supported by the intermediate axle means, a bolster system including a center bolster supported by the end side frame members, a braking system, an extension projecting from the end of the center bolster outwardly beyond one of said end axles, a fluid cylinder carried by said extension, arranged outwardly beyond the last-mentioned axle and having a piston rod, and means operatively connecting the piston rod to the braking system, said extension including a plate portion extending outwardly beyond the last-mentioned axles and extending transversely of the truck.

13. In a railway car truck, wheel supported end axles, end side frame members supported by said axles, wheel supported intermediate axle means, side frame equalizing members supported by the intermediate axle means, a bolster system including a center bolster supported by the end side frame members, a braking system, an extension projecting from the end of the center bolster outwardly beyond one of said end axles, a fluid cylinder carried by said extension, arranged outwardly beyond the last-mentioned axle and having a piston rod, and means operatively connecting the piston rod to the braking system, said cylinder being secured to the under-side of the extension, and the piston rod being in alignment with the longitudinal center line of the truck.

14. In a railway car truck, wheel supported end axles, end side frame members supported by said axles, wheel supported intermediate axle means, side frame equalizing members supported by the intermediate axle means, a bolster system including a center bolster supported by the end side frame members, a braking system, an extension projecting from the end of the center bolster outwardly beyond one of said end axles, a fluid cylinder carried by said extension, arranged outwardly beyond the last-mentioned axle and having a piston rod, and means operatively connecting the piston rod to the braking system, said extension including a plate portion arranged transversely of the truck and provided with supporting arms extending toward the center bolster and connected to the latter.

15. In a railway car truck, wheel supported end axles, end side frame members supported by said axles, wheel supported intermediate axle means, said frame equalizing members supported by the intermediate axle means, a bolster system including a center bolster supported by the end side frame members, a braking system, an extension projecting from the end of the center bolster outwardly beyond one of said end axles, a fluid cylinder carried by said extension, arranged outwardly beyond the last-mentioned axle and having a piston rod, and means operatively connecting the piston rod to the braking system, the last-mentioned means including a lever having its medial portion connected to the piston rod, and guide members for the lever carried by said extension.

16. In a structure of the character described, a railway truck having end axles, end side frame members supported by said axles, intermediate axle means, side frame equalizing members supported by said intermediate axle means and movably connected to said end side frame members, a bolster system including a center bolster supported by the end side frame members, a braking system, an extension projecting longitudinally from an end of the center bolster and comprising a plate portion from which arms extend toward the center bolster, a fluid cylinder carried by the plate portion of said extension and having a piston rod, and means operatively connecting the piston rod to the braking system.

17. In a structure of the character described, a railway car truck having wheel supported end axles, end side frame members supported by said axles, intermediate axle means, side frame equalizing members supported by said intermediate axle means, transverse bolsters supported by the end side frame members, a center bolster supported by said transverse bolsters, an extension projecting longitudinally from an end of the center bolster and comprising a plate portion from which arms extend toward the center bolster, said arms having portions engaging one of said transverse bolsters, a fluid cylinder carried by said extension and having a piston rod, and means operatively connecting the piston rod to the braking system.

18. In a structure of the character described, a railway car truck having end axles, end side frame members supported by said axles, intermediate axle means, side frame equalizing members supported by said intermediate axle means, a bolster system including a center bolster supported by the end frame members, a braking system, an extension projecting longitudinally from an end of the center bolster, a fluid cylinder carried by said extension and having a piston rod, and means operatively connecting the piston rod to the braking system.

19. In a structure of the character described a railway truck comprising articulated side frame structures and a bolster structure including a center bolster supported by said side frame structures, a braking system, an extension projecting longitudinally from an end of the center bolster, a fluid cylinder carried by said extension and having a piston rod, and means operatively connecting the piston rod to the braking system.

20. In a structure of the character described, a railway truck having end axles and intermediate axle means, an articulated side frame system supported by said axles and axle means, a bolster system including a center bolster resiliently supported by the side frame system, an extension projecting longitudinally from an end of the center bolster, a fluid cylinder carried by said extension and having a piston rod, and means operatively connecting the piston rod to the braking system.

21. In a structure of the character described, a railway car truck having wheel supported axles, articulated side frame members mounted on said axles and provided with bolster openings, a bolster system having transverse end portions extending into said openings and supported by said side frame members, a braking system, an extension projecting outwardly from the central portion of an end of the bolster system, a fluid cylinder carried by said extension, arranged outwardly beyond an end one of said axles and having a piston rod, and means operatively connecting the piston rod to the braking system.

22. In a railway car truck, a center bolster, a pressure fluid cylinder carried by an end portion of the bolster, a piston rod associated with the cylinder, an equalizer lever having its medial portion pivotally connected to the piston rod, dead cylinder levers fulcrumed from said end portion and operatively connected to said equalizer lever, and guide and supporting members for said lever arranged at opposite sides of the piston rod and secured to said end portion of the center bolster.

HARRY W. STERTZBACH.
CLAUDE L. ORR.